March 12, 1968        J. J. McCARTHY        3,372,908
QUICKLY OPENABLE SNATCH BLOCK
Filed Feb. 27, 1967        3 Sheets-Sheet 3
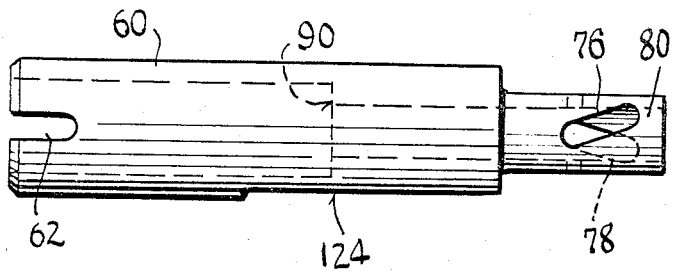
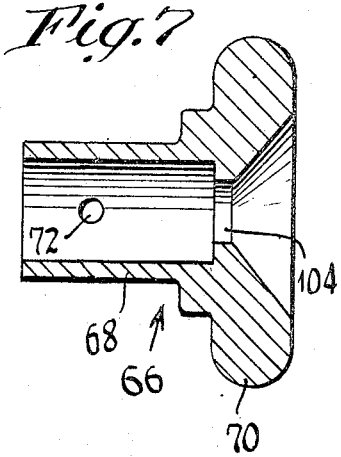
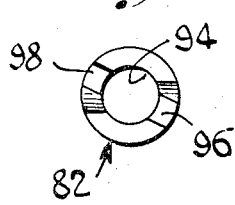
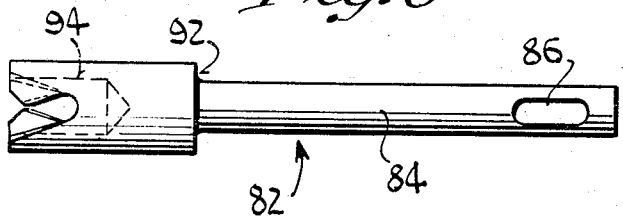
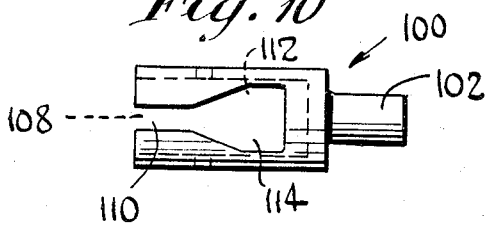
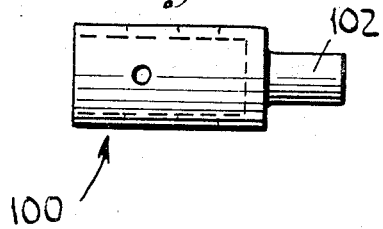
INVENTOR.
John J. McCarthy
BY
AGENT United States Patent Office 3,372,908
Patented Mar. 12, 1968

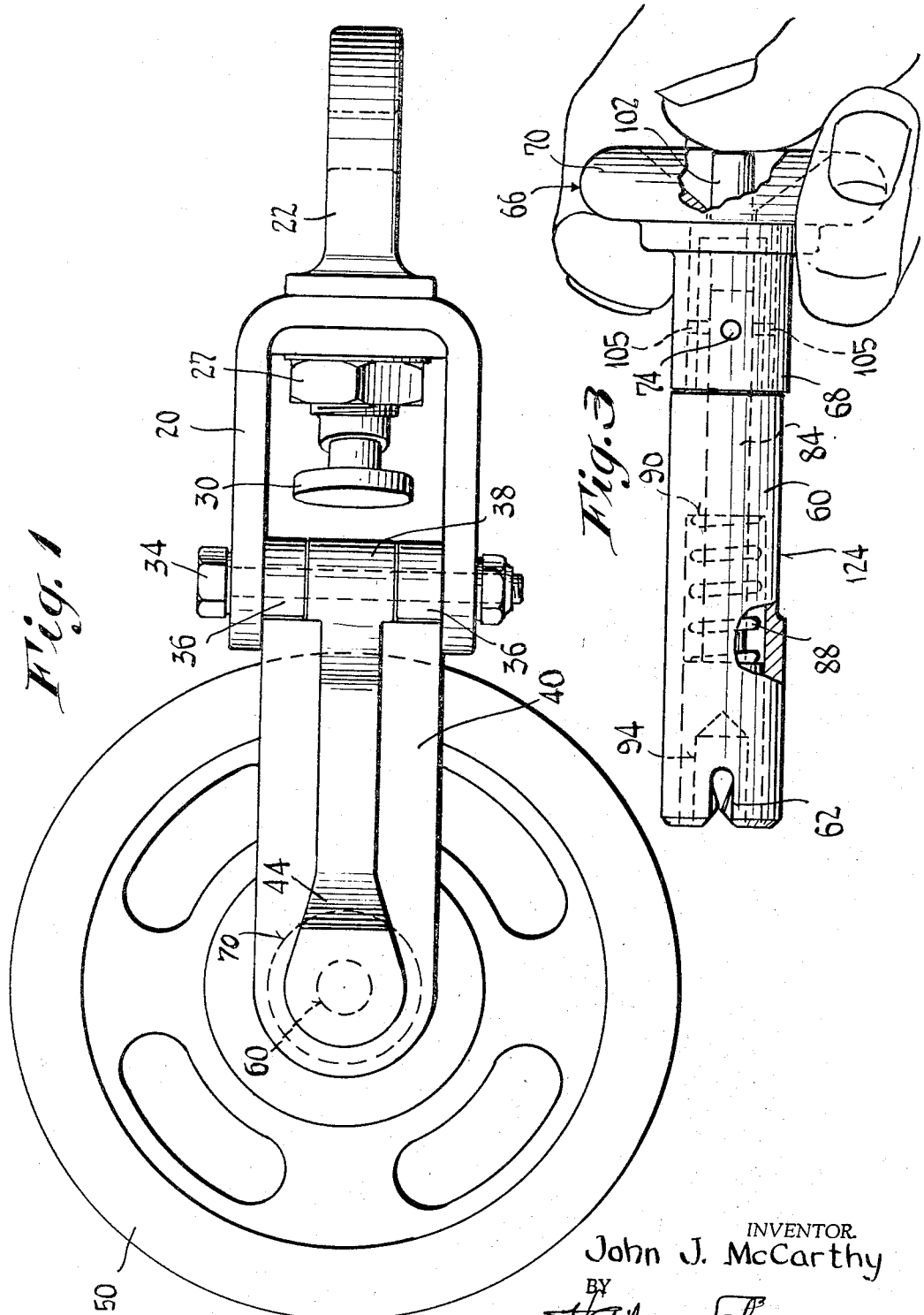

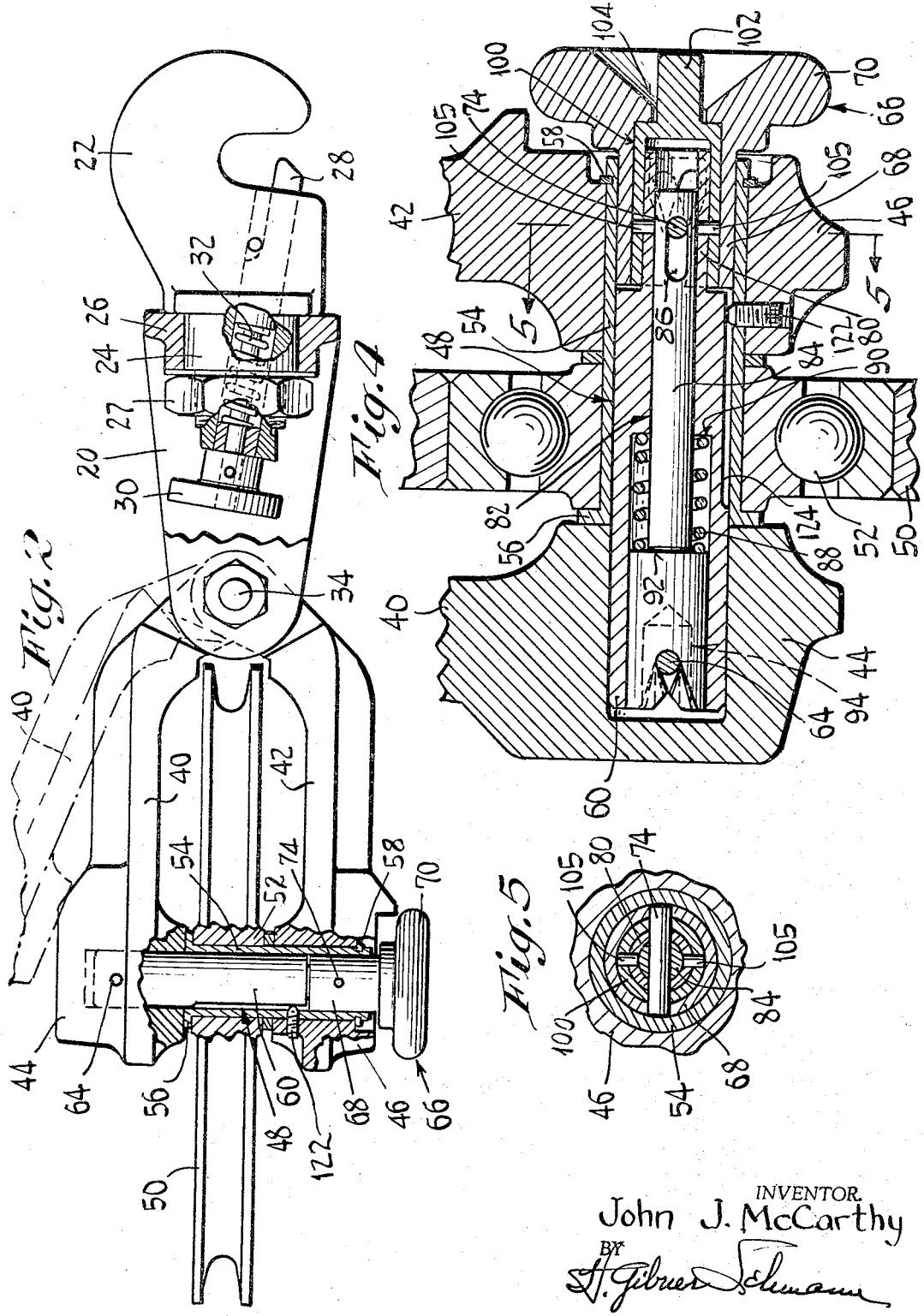

3,372,908
QUICKLY OPENABLE SNATCH BLOCK
John J. McCarthy, Weston, Conn., assignor to Norco, Inc., Ridgefield, Conn., a corporation of Connecticut
Filed Feb. 27, 1967, Ser. No. 618,722
6 Claims. (Cl. 254—193)

ABSTRACT OF THE DISCLOSURE

A quick-opening snatch block having a yoke with pivotally connected spaced arms which can be swivelled apart, one arm carrying a bearing bushing extending toward the other arm and having a pulley on said bushing, said one arm also having a captive pulley pin passing through the bushing and releasably latched to the other arm to either lock the arms in parallelism or else release the arms to permit their being swivelled apart. The yoke also has a swivel-mounted hook with a locking and release pin which passes through the swivel of the hook. The pulley pin of the snach block is a multi-part assemblage especially arranged to be quickly locked to or released from a cross member in said other arm of the block, all without requiring the use of tools.

Cross references (1) U.S. Patent No. 3,184,816
(2) U.S. Patent No. 3,280,439
(3) U.S. Patent No. 3,253,310

Background

This invention relates to snatch blocks and pulley pins thereof, and more particularly to pulley blocks having arms that are connected to each other by a swivel joint and that carry a pulley pin on which one or more pulleys is or are turnably mounted.

In prior snatch pulley blocks of the type referred to, a pulley pin passes through the pulley and through the extremities of the yoke arms to hold the arms in parallel relation and prevent their swivelling apart during use of the block. When cables or ropes are to be applied to or removed from the pulley, the pulley pin is unscrewed to permit the necessary swivelling and separation of the arms so as to provide side access to the pulley.

The removal of the pulley pin requires a tool, and is a somewhat slow operation, these factors constituting a distinct disadvantage.

Summary

The above drawbacks are obviated by the present invention, and objects of the invention include the provision of a novel and improved snatch pulley-block wherein opening of the block for placement or removal of a cable can be very easily and quickly effected. This is accomplished by a novel combination of stationary bearing bushing for the pulley of the snatch block, and quick-release, latch-type pulley or tie pin disposed in said bushing, in conjunction with a retraction-movement-limiting spline connection to said pin which holds the latter captive whereby the user, without requiring tools of any kind whatsoever, can immediately release and disengage the pin from the associated restrained block part and thereafter swivel open the block for the desired purpose.

Other objects of the invention are to provide an improved snatch block assemblage as above, which requires no tools and involves no loose parts in connection with its operation; to provide a snatch block as characterized, which is rugged and sturdy, reliable and foolproof in its operation at all times, and comprised of relatively few parts which are economical to manufacture and assemble; and to provide an improved multi-part, quick-acting pulley spindle or pin for a quick-opening snatch block of the kind indicated, which spindle is rugged and durable, easy operating, reliable and foolproof, simple in construction and low in cost.

Other features and advantages will hereinafter appear.

In the drawings:

FIG. 1 is a side elevational view of the improved pulley or snatch block as provided by the invention.

FIG. 2 is a top plan view of the pulley block, with portions shown in section to reveal interior details.

FIG. 3 is a plan view of a quick-release pulley bearing pin employed in the pulley block of FIGS. 1 and 2.

FIG. 4 is an axial sectional view of the pulley pin of FIG. 3, and of an associated bearing sleeve, together with associated portions of the block side arms.

FIG. 5 is a transverse section through the pulley pin, taken on the line 5—5 of FIG. 4.

FIG. 6 is a plan view of the outer tubular body member of the pulley pin shown in FIG. 3.

FIG. 7 is an axial sectional view of the knob or handle of the pulley pin.

FIG. 8 is a plan view of the inner body member of the pulley pin.

FIG. 9 is an end elevational view of the inner body member of FIG. 8.

FIG. 10 is a side elevational view of the release button of the pulley pin of FIG. 3.

FIG. 11 is a side elevational view of the release button, taken at 90° to the view of FIG. 10.

Referring to FIGS. 1 and 2, the improved pulley block construction of the invention comprises a yoke member 20 which is roughly of U-shape, said member having a hook 22 joined to it by a swivel joint or bearing comprising a shank 24 passing through an apertured bearing portion 26 of the yoke member, said shank carrying a nut 27 by which it is held captive in the member 20. The hook 22 can swivel or turn without restriction, and carries a draw bolt 28 passing through the shank 24 and having a manually grippable knob 30 by which it can be retracted. The draw bolt 28 is normally biased to the advanced, locking position shown by a compression spring 32.

The two arms of the yoke member 20 are apertured to receive a pivot bolt 34 which passes through apertured interfitting ends 36, 38 of side arms 40, 42 respectively of the pulley block. In their operative positions, the side arms 40, 42 are generally parallel, as seen in FIG. 2, said arms having apertured bearing portions or ends 44, 46 respectively receiving a novel spindle or pulley pin generally designated by the numeral 48.

In accordance with the present invention, the pulley pin or spindle 48 is constituted in a novel manner whereby it may be easily and quickly, fully disconnected from the side arm 40 for the purpose of enabling such side arm to be swivelled out and away from the other arm 42 as indicated by the broken outline in FIG. 2.

On the spindle 48 there is carried a pulley 50 which, as illustrated in FIG. 4, may be mounted on an anti-friction ball bearing assemblage 52 to enable it to turn easily under appreciable load.

By thus swinging the side arm 40 out and away from the pulley 50 it is possible to either remove a rope which passes over the pulley, or else replace a rope on a pulley without requiring access to an end of the rope. During the swung-away or opened condition of the side arm 40, the pulley 50 will be retained in its operative position on the spindle 48 even though the latter has been disengaged from the side arm 40 to free the same for the outward pivotal movement thereof.

The spindle 48 comprises an outer bearing sleeve or bushing 54 having at one end an outwardly turned flange or shoulder 56 engaged with the ball bearing 52, and having at its other end an annular external groove receiving a split ring 58 engaged with the bearing portion 46 of the side arm 42. By such construction, the pulley 50 and the ball bearing 52 thereof are retained and permanently rotatably mounted on the side arm 42.

The pulley pin or spindle 48 further comprises an outer tubular body member 60 having at one end a pair of oppositely-disposed open slots 62 which are adapted to receive a cross pin 64 disposed in the bearing portion 44 of the arm 40.

The outer body member 60 is advanceable and retractable in the bearing sleeve 54, being shown in its advanced position in FIGS. 2 and 4 wherein it has fully entered the side arm 40 and has become locked to the cross pin 54 thereof. Such locking action retains the side arm 40 in the relative position of FIG. 2 and prevents the arm from being swivelled away to the broken line position thereof.

The outer body member 60 is loosely pin-connected to a handle member 66 which is in the form of a knob, said knob having a shank 68 of the same outside diameter as the outer body member 60, and having a wheel or rim portion 70 arranged for convenient engagement by the fingers.

The shank 68 has a pair of oppositely-disposed holes 72 adapted to receive and hold captive a cross pin 74 which passes through obliquely disposed slots 76, 78 in a reduced-diameter portion 80 of the member 60.

With such construction, while the handle 66 is held captive on the outer body member 60 by the cross pin 74, the handle is permitted to have limited axial movement with respect to the body member 60, this being accompanied by a slight extent of relative turning between the body member and the handle. The function of the oblique disposition of the slots 76, 78 will be brought out later, in connection with the explanation of the releasing movement of the pulley spindle.

The spindle 48 further comprises an inner body member 82 having a shank portion 84 which is loosely received in the bore passing through the small diameter portion 80 of the outer body member, and having a longitudinal slot 86 in said shank portion, through which the cross pin 74 passes. The inner body member 82 is thus also held captive by the cross pin 74, as is the outer body member 60 whereas both said members can have a limited extent of relative axial movement with respect to each other and also with respect to the handle or knob 66. The relative axial movement of the inner body member 82 will not result in its turning with respect to the handle 66 whereas the axial movement of the outer member 60 will result in a relative turning with respect to the handle.

Normally the inner and outer body members 60, 82 are maintained in a given predetermined axial locking position as shown in FIG. 4, by means of a helical compression spring 88 disposed on the reduced shank portion 84 between shoulders 90 and 92 of the outer and inner members respectively.

For such normal, locking position of the pulley pin the left-most ends of the outer and inner members 60, 82 as viewed in FIGS. 3, 4, 6 and 8 will be flush with each other, as clearly seen in FIG. 4.

The left-most end portion of the inner body member 82 has a bore 94 and a pair of oblique oppositely-disposed slots 96, 98 which are adapted to receive the cross pin 64 of the side arm 40.

The slots 96, 98 are hereinafter in the claims referred to as a "slot formation," this same being true of the slots 62 of the outer member 60.

Referring now to FIG. 4, when the outer and inner body members 60, 82 are in the relative positions shown as effected by the spring 88, the cross pin 64 will be held captive in the slots 62 of the outer member and slots 96, 98 of the inner member. This is due to the oblique disposition of the slots 96, 98, in conjunction with the straight or axial dispositions of the slots 62. However, if the inner member 82 is made to have a left-to-right axial movement with respect to the outer member 60, the corresponding relative turning movement of said members as effected by the oblique slots 76, 78 will enable the cross pin 64 to traverse in an outward direction the end slots 62, 96, 98 of said members, thereby to effect a release of the cross pin 64 and side arm 40 from the pulley pin or spindle 48. Such relative movement of the outer and inner members is effected by a depress button 100 which is slidably carried in the handle 66 and which has a projecting portion 102 extending through a central opening 104 in the handle 66. The button 100 is slidably received in the bore of the shank 68 of the handle 66 and snugly fits around the reduced diameter portion 80 of the outer member 60, being affixed thereto by pins 105. The button is accordingly in effect spring-urged outward or to the right as viewed in FIG. 4 by the same helical compression spring 88 which acts on the body members 60 and 82.

The release button 100 has oppositely disposed slots 108, 110 with enlarged bottom portions 112, 114 respectively, receiving with large clearances the cross pin 74. By such arrangement, the release button 100 does not limit the relative movements of the body members 60, 82 even though affixed to the member 60. When the button 100 is engaged and "depressed" from the position shown in FIG. 4 as by using the fingers of one hand as illustrated in FIG. 3, the actual movement which will occur is an outward or left-to-right movement of the knob 66 and pin 74 (since the body member 60 is bottomed against the pin 64). This will result in a left-to-right movement of the cross pin 74, and in consequence the oblique slots 76, 78 of the outer member will react with the cross pin 74 turning the latter and the inner body member 82. Simultaneously the inner body member 82 will also shift to the right, following the left-to-right movement of the pin 74 as caused by the similar movement of the knob 66. Since the outer body member 60 is prevented from turning by virtue of the cross pin 64 being disposed in the straight slots 62, the turning of the inner body member 82 will result in the pin 64 being travelled out of the end slot formations of the body members as the inner member 82 turns and shifts to the right.

Both the said members will thus become freed from the cross pin 64. Upon this occurring, a continued pull on the handle 66 will axially shift or slide the entire pin assemblage (except the sleeve 54) from the bearing portion 44 of the side arm 40. The side arm is thus free to be swung outward as indicated in FIG. 2. The restoring of the side arm to the operative position shown in full lines in FIG. 2 involves an opposite operation. The side arm 40 is first swung into the parallel position and thereafter the pulley pin comprising the outer and inner body portions 60, 82 is advanced by grasping the handle 66, while retaining the release button 100 in the depressed position. Registration of the mouths of the end notches to receive the cross pin 64 is achieved by this action. The registered notches of the body members 60, 82 are aligned with the cross pin 64 by means of a spline or screw 122 threaded into the bearing portion 46 of the side arm 42 and extending through the bearing sleeve 54. The screw 122 occupies a groove or flat 124 provided on the outer body member 60, FIGS. 4 and 6. The screw 122 rigidly affixes the sleeve 60, FIGS. 4 and 6. The screw 122 rigidly affixes the sleeve or bearing bushing 54 to the side arm 42, whereby the pulley 50 is maintained on said arm at all times.

It will now be understood from the foregoing that I have provided a novel and improved combination of snatch pulley block and quick-release pulley or tie pin or spindle by which a pivoted side arm of the pulley block may be easily and quickly swung away from the pulley, to provide access to the side thereof for the purpose of removing or replacing ropes or cables. The organization as illustrated and described herein provides for the maximum convenience in the operation of the pulley block, without requiring the use of tools, special techniques or operating procedures. The required movements may be easily and properly effected, and the closing and locking of the pulley block is reliable and foolproof.

Relatively few components are involved, and the manufacturing and assembly costs are held to a relatively low figure. The retention of the cross pin 64 by the pulley pin is securely effected, preventing likelihood of failure or malfunctioning of the device.

Variations and modifications may be made within the scope of the claims, and portions of the improvement may be used without others.

I claim:

1. A snatch pulley-block construction comprising, in combination:
   (a) a yoke member having a pair of arms extending alongside each other in spaced relation,
   (b) means pivotally connecting one pair of adjoining ends of the arms to each other to enable pivotal separation of the arms,
   (c) the other pair of adjoining ends of the arms having bearing means for supporting a spindle, wherein the improvement comprises:
   (d) a bearing bushing carried in one said bearing means and extending across the space between the arms to a point adjacent the other said bearing means,
   (e) a pulley on said bearing bushing,
   (f) a spline carried by said bearing bushing, extending into the bore thereof,
   (g) a tie pin having a longitudinal spline groove, said pin passing through the bearing bushing and into the other said bearing means, said spline groove receiving the spline of the bushing whereby the pin is held captive and is movable between positions either occupying the other said bearing means or else removed therefrom,
   (h) cooperable, releasable lock means on one end of the tie pin and the other said bearing means, releasably holding the tie pin captive in said bearing means,
   (i) release means having a manually operable part adjacent said handle, for operating said lock means to release the latter so as to enable the tie pin to be withdrawn from the other said bearing means whereby the arms of the yoke member can be separated to provide additional access to the pulley.

2. A snatch pulley block construction as in claim 1, wherein:
   (a) the spline carried by the bearing bushing comprises a screw threaded into one of the other pair of adjoining ends of the arms of the yoke member.

3. A snatch pulley block construction as in claim 1, wherein:
   (a) the releasable lock means comprises a cross pin in the other said bearing means and a two-piece slotted formation on the end of the tie pin, adapted to releasably grip said cross pin.

4. A snatch pulley block construction as in claim 3, wherein:

(a) the handle on the other end of the tie pin comprises a knob,
   (b) said manually operable part comprising a push button centrally disposed in said knob.

5. A snatch pulley block construction as in claim 3, wherein:
   (a) said spline and spline groove hold the tie pin from turning and maintain an alignment between the said cross pin and notched formation to facilitate entry of the cross pin.

6. A quick-release retractable pulley spindle for a pulley block, comprising in combination:
   (a) an elongate outer body member and a handle carried by one end of said member, wherein the improvement comprises:
   (b) said outer body member having a bore and having an open-ended slot formation at the other of its ends,
   (c) an elongate inner body member longitudinally and turnably movable within the outer body member and having at one end an open-ended slot formation adjacent the open-ended slot formation of the outer member,
   (d) said slot formations being alignable to receive a cross pin carried by an arm of the pulley block,
   (e) the slot formation of one body member having a twisted configuration whereby entry and exit of the cross pin into and out of the said slot formations require relative turning of the body members,
   (f) guide means on the body members for effecting said relative turning in response to relative axial movement of the members between two predetermined positions, either a transition position wherein mouth portions of the slot formations are registered to receive the cross pin from an outside direction or else a locking position wherein bottom portions of the slot formations are registered to receive the cross pin from said mouth portions and lock the pin against removal,
   (g) spring means biasing the body members in relative longitudinal directions toward said locking position,
   (h) said handle having an axial bore, and
   (i) a release button carried and movable in the bore of the handle and connected to said inner body member to shift the latter axially against the action of the spring means from the locking position to the transition position,
   (j) said release button having a transverse, finger-engageable end surface adjacent the handle whereby the latter and button end surface can be simultaneously engaged by the fingers of one hand to actuate the button.

References Cited

UNITED STATES PATENTS

| | | | |
|---|---|---|---|
| 2,446,220 | 8/1948 | Erdahl | 254—193 |
| 2,633,329 | 3/1953 | Le Bus | 254—193 |
| 3,191,910 | 6/1965 | Eitel | 254—193 |

EVON C. BLUNK, *Primary Examiner.*

H. C. HORNSBY, *Assistant Examiner.*